US008284059B2

(12) United States Patent
Ross (10) Patent No.: US 8,284,059 B2
(45) Date of Patent: Oct. 9, 2012

(54) INVENTORY MONITORING AND VERIFICATION SYSTEM

(75) Inventor: Graham Ross, Poway, CA (US)

(73) Assignee: CareFusion 303, Inc., San Diego, CA (US)

( * ) Notice: Subject to any disclaimer, the term of this patent is extended or adjusted under 35 U.S.C. 154(b) by 478 days.

(21) Appl. No.: 12/563,986

(22) Filed: Sep. 21, 2009

(65) Prior Publication Data

US 2011/0068922 A1    Mar. 24, 2011

(51) Int. Cl.
G08B 13/14    (2006.01)
(52) U.S. Cl. .................. 340/572.1; 340/539.1; 340/10.1
(58) Field of Classification Search ............... 340/572.1, 340/568.1, 10.1, 10.4, 572.2–572.9, 539.1, 340/501, 505, 10.41, 6.1, 5.61
See application file for complete search history.

(56) References Cited

U.S. PATENT DOCUMENTS

| | | | |
|---|---|---|---|
| 5,886,634 A * | 3/1999 | Muhme ...................... 340/572.1 |
| 5,887,176 A | 3/1999 | Griffith et al. |
| 6,286,762 B1 | 9/2001 | Reynolds et al. |
| 6,354,493 B1 | 3/2002 | Mon |
| 6,959,862 B2 * | 11/2005 | Neumark ...................... 235/385 |
| 7,009,518 B2 | 3/2006 | Liao et al. |
| 7,227,468 B1 | 6/2007 | Florio |
| 7,552,871 B2 * | 6/2009 | Ainasoja ...................... 235/385 |
| 2004/0128025 A1 | 7/2004 | Deal |
| 2005/0157865 A1 | 7/2005 | Yeager et al. |
| 2006/0016897 A1 * | 1/2006 | Yasuda et al. ................. 235/492 |
| 2007/0023512 A1 | 2/2007 | Miller et al. |
| 2007/0040682 A1 * | 2/2007 | Zhu et al. .................... 340/572.1 |
| 2007/0150382 A1 | 6/2007 | Danilewitz |
| 2007/0208454 A1 | 9/2007 | Forrester et al. |
| 2007/0208598 A1 | 9/2007 | McGrady et al. |
| 2008/0024273 A1 | 1/2008 | Kruest et al. |
| 2009/0134997 A1 * | 5/2009 | Godlewski ................. 340/539.1 |

FOREIGN PATENT DOCUMENTS

| | | |
|---|---|---|
| JP | 2008-084331 A | 4/2008 |
| KR | 10-2008-0107930 A | 12/2008 |
| WO | 01-67356 A1 | 9/2001 |
| WO | WO 2007064816 | 6/2007 |
| WO | WO 2007112413 | 10/2007 |

OTHER PUBLICATIONS

International Search Report and Written Opinion in PCT Application No. PCT/US2010/049713 dated Apr. 27, 2011 in 9 pages.

* cited by examiner

Primary Examiner — Daniel Previl
(74) Attorney, Agent, or Firm — McDermott Will & Emery LLP

(57) ABSTRACT

Methods and systems for monitoring the inventory of products in a storage device that has an antenna are provided, wherein each product has a corresponding wireless tag having a unique wireless tag identification. The inventory monitoring includes accessing an inventory list containing at least one wireless tag identification, sending a specific query via the antenna for each of the at least one wireless tag identifications in the inventory list to the corresponding wireless tag, verifying, in the case that a response is received from the wireless tag corresponding to the wireless tag identification, that the product corresponding to the wireless tag is present in the storage device, determining, in the case that a response is not received from the wireless tag corresponding to the wireless tag identification, that the product corresponding to the wireless tag is not present in the storage device, and updating the inventory list based on the products verified to be present and the products determined to not be present in the storage device.

22 Claims, 9 Drawing Sheets

| WIRELESS TAG IDENTIFICATION | ASSOCIATED MEDICAL PRODUCT | PRESENT? STATUS | TIME REMOVED | PERSON LAST ACCESSED | OTHER |
|---|---|---|---|---|---|
| 101100 | PAIN KILLER | YES | | JOE | --- |
| 011001 | IV PUMP | NO | 06.18.09.18.33 | FRED | --- |
| ... | ... | ... | ... | ... | ... |
| ... | ... | ... | ... | ... | ... |
| ... | ... | ... | ... | ... | ... |

Figure 9

INVENTORY MONITORING AND VERIFICATION SYSTEM

FIELD

The disclosure herein generally relates to inventory monitoring and control of dispensed products and, in particular, relates to a system for monitoring and verification of an inventory of identification tag-based products for dispensation.

BACKGROUND

Centralized inventory systems are frequently used in the medical community to track and dispense medical products such as medications, medical devices, etc. Some of these items are sophisticated and expensive instruments, and keeping close track of these items is desirable from a caregiver viewpoint as well as an ownership viewpoint. For a caregiver, it is important to be able to quickly and accurately locate a needed item. As an owner of the facility, it is important that very expensive items, such as electronic instruments, be protected from theft to the extent possible.

In such a centralized inventory system, medical products are often stored in a storage area, such as a wall cabinet or other secure location. The dispensation of the products from the storage area can be tracked by requiring authorized users to indicate in a tracking log which products, and what quantity thereof, they have removed from the storage area. Similarly, low-stock and out-of-stock warnings can be provided by an alert user who notes the dwindling supply of a product as he removes it. These systems, however, rely upon the compliance of the users to track the dispensation of products therefrom, and are therefore prone to inaccuracy.

Certain inventory systems are automated for the tracking of inventory. For example, some known inventory tracking systems use RFID tags by placing a unique RFID tag on each item stored in a secure cabinet and having an RFID antenna located in or near the cabinet to monitor the presence of the items in the cabinet by detecting the presence of each unique RFID tag associated with each item. The RFID antenna in such systems is often connected to a processor or computer for tracking inventory, wherein the computer is locally provided in or near the cabinet or is connected remotely via a connection or network. Such RFID-based inventory systems conduct an inventory monitoring process by periodically scanning a storage area to identify all products currently stored in the storage area and creating a current inventory list. Then, such systems compare the current inventory list with a past inventory list to determine if any products have been removed. The problem with such systems is that this periodic "scan-and-discover" process requires significant time and processing resources until the scan is completed before the new current inventory list can be completed. This is because the "scan" is a general broadcast query which is not addressed to any particular wireless tag. All present wireless tags then respond to the scan broadcast signal with a generic response which is an invitation for further communication. Then, for each responding wireless tag, the system must send at least one secondary query directed specifically to the responding wireless tag to obtain its identification and to obtain information related to the corresponding tag and associated medical product. The wireless tag then responds with such information which is then processed and stored by the inventory monitoring system. It can be appreciated that this "scan-and-discover" process is cumbersome as it results in multiple communications between each wireless tag and the inventory monitoring system, including lengthy data transmissions from each wireless tag to the inventory monitoring system.

SUMMARY

Embodiments described herein address the foregoing problems by tracking the current inventory and dispensation of products from storage areas through the use of wireless tags. As user's compliance is not required to track the current inventory and dispensation of products, the accuracy and efficacy of the dispensation tracking is improved. In particular, a fast inventory verification process is presented in which a past inventory of already-known wireless tags is utilized to significantly reduce time and resources required as compared to a scan-and-discover process. An accurate inventory can be reliably and automatically maintained in a fast and efficient manner.

Certain embodiments provide a method of monitoring the inventory of a plurality of products from a storage device that has an antenna, wherein each product has a corresponding wireless tag having a unique wireless tag identification. The method comprises the steps of accessing an inventory list containing at least one wireless tag identification, sending a specific query via the antenna for each of the at least one wireless tag identifications in the inventory list to the corresponding wireless tag, verifying, in the case that a response is received from the wireless tag corresponding to the wireless tag identification, that the product corresponding to the wireless tag is present in the storage device, determining, in the case that a response is not received from the wireless tag corresponding to the wireless tag identification, that the product corresponding to the wireless tag is not present in the storage device, and updating the inventory list based on the products verified to be present and the products determined to not be present in the storage device. In some embodiments, the method further includes commanding all wireless tags verified in the verifying step to be present in the storage device to enter a quiescent state, performing a scan operation to determine the presence of a new wireless tag that does not have a corresponding wireless tag identification in the inventory list, and updating the inventory list to include each new wireless tag determined to be present during the scan operation.

Certain embodiments provide an inventory monitoring system for monitoring an inventory of products each of which has a corresponding wireless tag with a corresponding wireless tag identification. The inventory monitoring system includes a securable storage area, an antenna operable to receive and transmit signals within the securable storage area, and a processor configured to access an inventory list containing at least one wireless tag identification, send, for each of the at least one wireless tag identification in the inventory list, a specific query via the antenna to the wireless tag corresponding to the wireless tag identification, verify, in the case that a response is received via the antenna from the wireless tag corresponding to the wireless tag identification, that the product corresponding to the wireless tag is present in the securable storage area, determine, in the case that a response is not received via the antenna from the wireless tag corresponding to the wireless tag identification, that the product corresponding to the wireless tag is not present in the securable storage area, and update the inventory list based on the products verified to be present and the products determined to not be present in the securable storage area. In some embodiments, the processor is further configured to command all wireless tags verified in the verifying step to be present in the storage device to enter a quiescent state, perform a scan operation to determine the presence of a new wireless tag that does not have a corresponding wireless tag identification in the inventory list, and update the inventory list to include each new wireless tag determined to be present during the scan operation.

It is to be understood that both the foregoing summary and the following detailed description are exemplary and explanatory and are intended to provide further explanation of the embodiments as claimed.

BRIEF DESCRIPTION OF THE DRAWINGS

The accompanying drawings, which are included to provide further understanding of the disclosure and are incorporated in and constitute a part of this specification, illustrate embodiments and together with the description serve to explain the principles of the disclosed aspects and embodiments. In the drawings.

DETAILED DESCRIPTION

In the following detailed description, numerous specific details are set forth to provide a full understanding of the disclosed and claimed embodiments. It will be apparent, however, to one ordinarily skilled in the art that the embodiments are capable of being practiced without some of these specific details.

Maintaining an accurate inventory of medical products (e.g., medications, medical devices, biological samples, donated organs, etc.) is an important part of providing exemplary patient care. Accordingly, certain embodiments provide accurate, automated methods and systems for efficiently monitoring inventory of products from a storage device (e.g., cabinets, stock rooms, drawers, etc.). Certain embodiments provide a fast and efficient inventory verification process in which a past inventory of already-known wireless tags is utilized to significantly reduce time and resources required as compared to a scan-and-discover process. In addition to the efficient monitoring the inventory of products through which dispensation of products is tracked, certain embodiments can also associate authorized users with the products they dispense from the storage device, and maintain a database of product information for the products in the storage device.

Figure 1A:
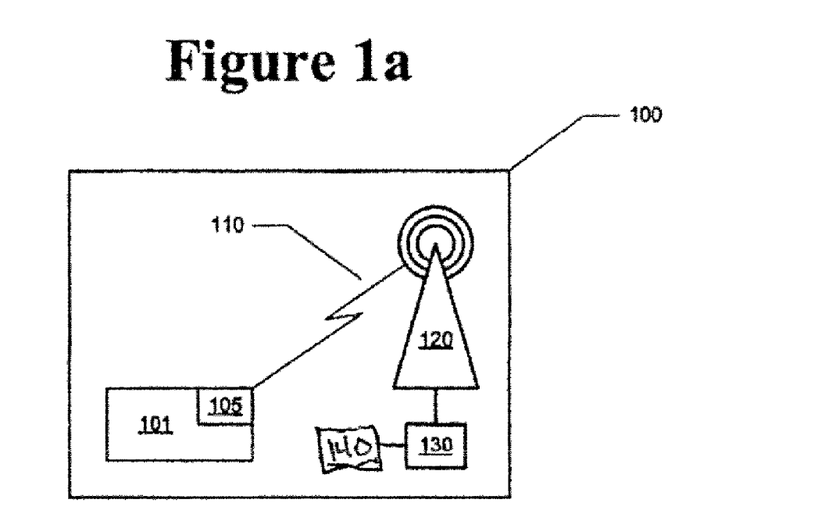
FIG. 1a is a block diagram illustrating an inventory monitoring system in accordance with certain embodiments.

Turning to FIG. 1a, a block diagram is shown that illustrates an inventory monitoring system in accordance with certain embodiments. The system includes a securable storage area 100, together with an antenna 120 that can transmit and receive signals within storage area 100, and a processor 130 operably coupled to antenna 120. Storage area 100 is, for example, a lockable drawer, cabinet or stock room, in which medical products are stored. According to one aspect, the boundaries of storage area 100 are determined by the effective range of antenna 120. For example, the walls of storage area 100 act to reduce the signal strength of antenna 120 below an effective threshold outside of storage area 100. Alternatively, the boundaries of storage area 100 are narrower or larger than the effective range of antenna 120.

As illustrated in FIG. 1a, disposed within storage area 100 is a medical product 101. Of course, it should be appreciated that certain aspects are designed to monitor a plurality of medical products beyond just one medical product. Medical product 101 is, for example, a medication or package of medication, a medical device such as a syringe, a medical instrument such as an infusion pump, or any one of a number of other medical products for which reliable inventory monitoring and dispensation tracking is desired. Associated with medical product 101 is a wireless tag 105, wherein wireless tag 105 is attached, detachably secured, or provided on or in medical product 101. Wireless tag 105 is, for example, a wireless identification tag such as an RFID tag. RFID tags are well known to those of skill in the art, in part because of their relatively low cost, their small size, and the ease with which they can be integrated into various types of packaging. Active RFID tags typically contain an internal battery and are typically more complex and larger in size than passive tags, which are lower in cost, complexity and size. Active tags often have longer detection range and have more functional capabilities than passive tags, and active tags may have the ability to be reused. Passive tags are simple in function for the purpose of providing a unique identification and are typically disposable.

Figure 1B:
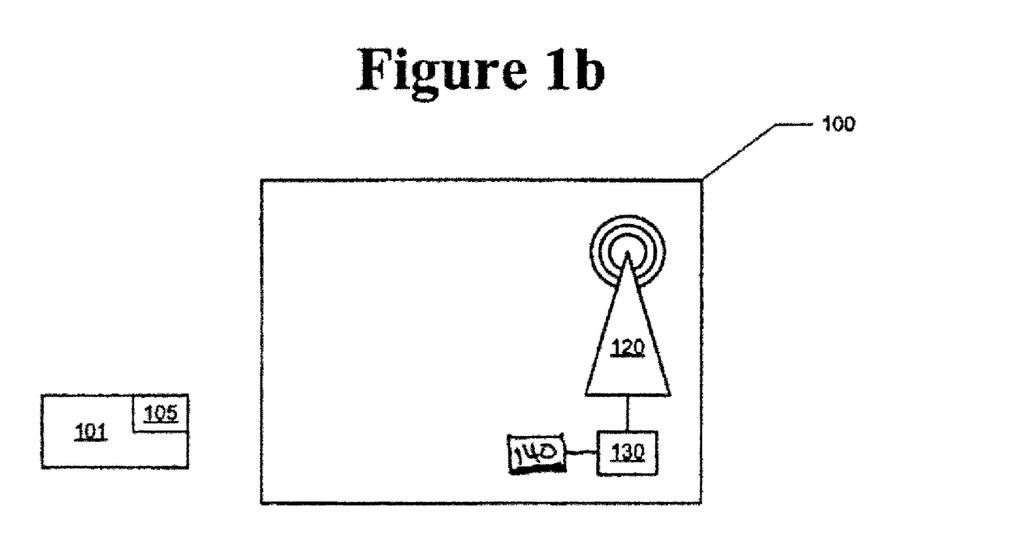
FIG. 1b is a block diagram illustrating an inventory monitoring system in accordance with certain embodiments.

Processor 130 is configured to establish and utilize a wireless link 110 between antenna 120 and wireless tag 105 on medical product 101. As seen in FIG. 1a, processor 130 is in connection with memory 140 through which processor 130 can store and retrieve data, as discussed further below. Processor 130 uses the wireless link 110, either continuously or at periodic intervals, to communicate with wireless tag 105 and thereby determine whether medical product 101 is still within the range of antenna 120 (i.e., whether medical product 101 is still within storage area 100). Once medical product 101 has been removed from storage area 100, as illustrated in FIG. 1b, wireless link 110 is lost (e.g., because wireless tag 105 of medical product 101 is outside the effective range of antenna 120). Processor 130, which has been using wireless link 110 in attempts to communicate with wireless tag 105, determines that wireless link 110 has been lost, and accordingly determines that medical product 101 is no longer present in storage area 100 (i.e., has been dispensed from storage area 100). In certain aspects, processor 130 is provided with a clock or access to a timing signal, whereby processor 130 determines at what time medical product 101 was dispensed from storage area 100, and records the dispensation of medical product 101 in a memory, such as memory 140, or external database (as described in greater detail below) that is in communication with processor 130.

While the wireless tag of the present exemplary embodiment has been described as an RFID tag, it should be appreciated that embodiments described herein can be used with various types of identification tags. As will be readily apparent to those of skill in the art, any one of a number of different wireless identification tags are usable, including, for example, active RFID tags, passive RFID tags, semi-passive RFID tags, RuBee tags, Bluetooth™ tags, or near field communication ("NFC") tags.

Figure 2A:
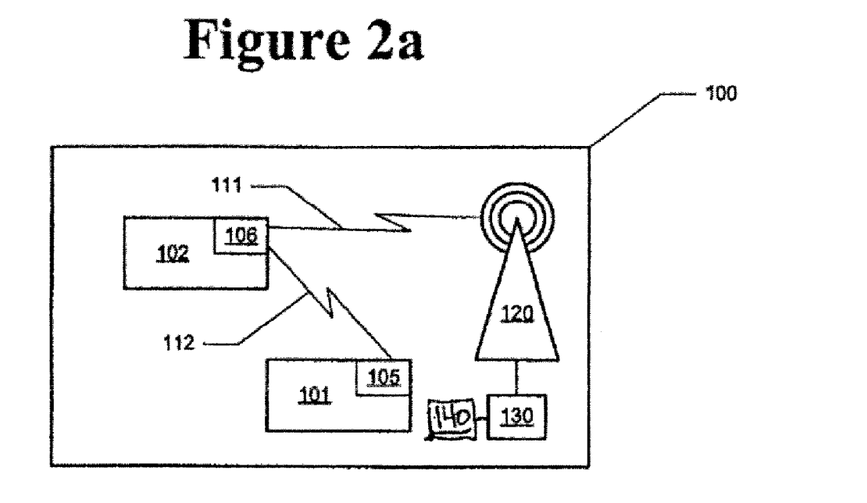
FIG. 2a is a block diagram illustrating an inventory monitoring system in accordance with certain embodiments.
Figure 2B:
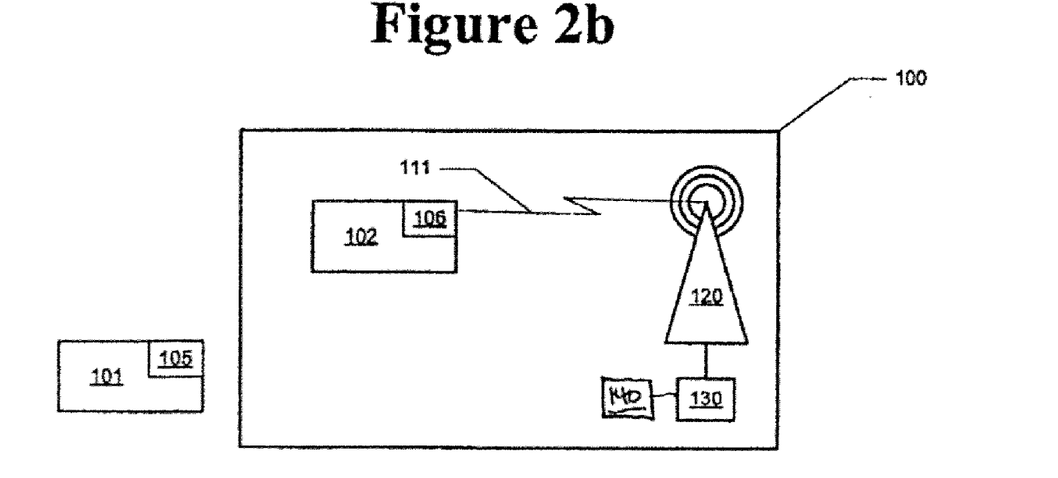
FIG. 2b is a block diagram illustrating an inventory monitoring system in accordance with certain embodiments.

In accordance with certain embodiments, the wireless link utilized by processor 130 to communicate with each wireless tag associated with a medical product need not be a direct link between antenna 120 and the wireless tag. For example, FIG. 2a is a block diagram illustrating an inventory monitoring system in accordance with certain embodiments, in which multiple medical products, such as medical products 101 and 102, are disposed within storage area 100 of the system. Processor 130 directs antenna 120 to use wireless link 111 to communicate with wireless tag 106 of medical product 102. In the system of FIG. 2a, another wireless link 112 is established between wireless tag 106 of medical product 102 and wireless tag 105 of medical product 101. Wireless tag 106 of medical product 102 is configured to relay information sent over wireless link 112 to antenna 120 over wireless link 111. Accordingly, processor 130 is able to monitor both wireless link 112 and wireless link 111 to effectively communicate with both wireless tag 106 of medical product 102 and wireless tag 105 of medical product 101. In this manner, when medical product 101 is removed from storage area 100, as illustrated in FIG. 2b, processor 130 is able to determine when wireless link 112 is lost, via wireless link 111 with wireless tag 106, and thereby establish when medical product 101 has been dispensed from storage area 100.

Alternatively, if medical product 102 had been dispensed from storage area 100, in lieu of medical product 101 (as has been illustrated in FIG. 2b), both wireless links 111 and 112 would have been lost, at least temporarily. In this scenario, wireless tag 105 of medical product 101, which is configured to continually seek to establish wireless links with either antennas such as antenna 120 or other similarly configured wireless tags, quickly establishes a new wireless link with antenna 120, resulting in the configuration previously described with respect to FIG. 1a. Thus, if processor 130 determines, while monitoring the wireless links, that wireless link 111 has been lost, a new wireless link (e.g., like wireless link 110 in FIG. 1a) is established within a time period less than a predetermined threshold, and processor 130 does not therefore determine that medical product 101 has been dispensed.

In certain embodiments, wireless tags such as wireless tags 105 and 106 communicate with each other and with antenna 120 over a single frequency. In other embodiments, wireless tags 105 and 106 communicate with each other on a first frequency, and communicate with antenna 120 on a second frequency. For example, in the embodiment illustrated in FIG. 2a, wireless tag 106 communicates with antenna 120 via link 111 on a higher frequency (e.g., one with a greater range or better reliability) than the frequency with which wireless tags 105 and 106 communicate among each other via link 112. Such an arrangement provides a more robust connection between wireless tag 106 and antenna 120, to ensure that the information about product 101, which is relayed by wireless tag 106, reaches antenna 120. In some aspects, a lower frequency (e.g., one which consumes less battery power) is utilized to communicate between wireless tags, as each wireless tag in a storage area need not communicate with every other wireless tag, but only those neighboring wireless tags that are relatively close (as will be discussed in greater detail below).

In certain embodiments, groups of wireless tags associated with their respective medical products disposed within the same storage device form spontaneous "mesh networks" (e.g., networks for which no additional infrastructure beyond the wireless tags is necessary) that can connect wirelessly with the antenna of the inventory monitoring system. The mesh network can be considered to be at least partially self-aware, in the sense that the presence of each wireless tag is "known" to one or more nearby wireless tags with which it has formed wireless links. Accordingly, when one wireless tag (attached to a medical product) is missing from the mesh network (e.g., because it has been dispensed from the storage area), the mesh network will be able to communicate that information to the antenna of the inventory monitoring system. Accordingly, the antenna need not be directly connected to (i.e., need not form wireless links with) each wireless tag respectively associated with each product in the storage area.

Figure 3:
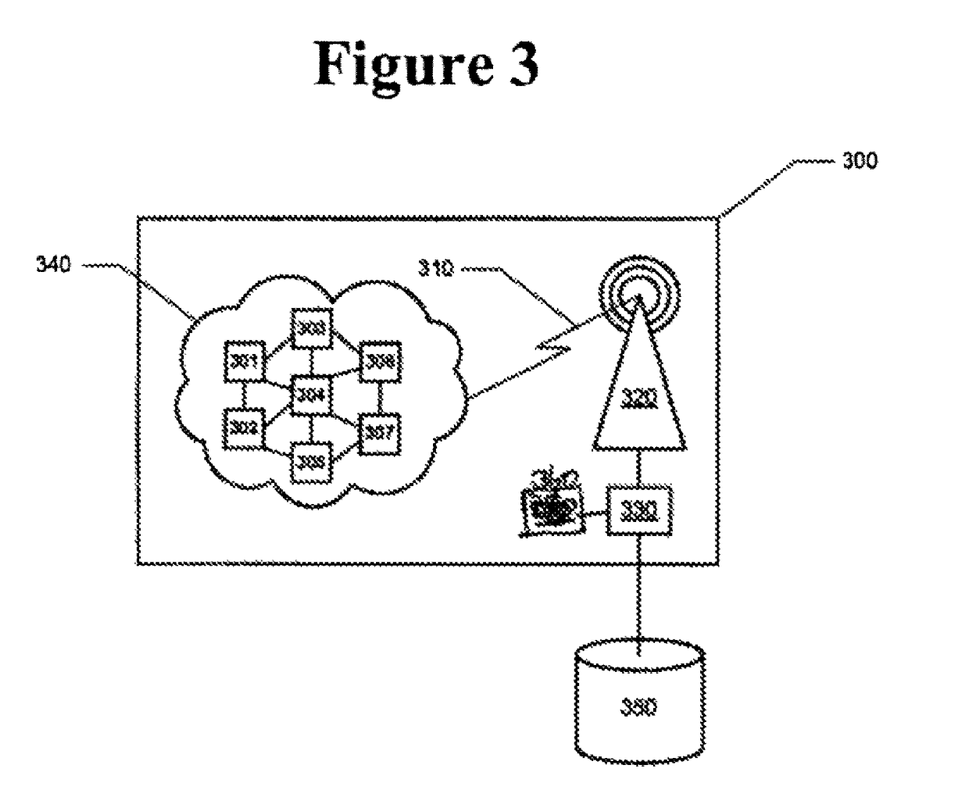
FIG. 3 is a block diagram illustrating an inventory monitoring system in accordance with certain embodiments.

This concept is illustrated in FIG. 3, in which a block diagram of an inventory monitoring system is shown in accordance with certain embodiments. The inventory monitoring system includes a storage area 300, an antenna 320 operable within storage area 300, and a processor 330 operably coupled to antenna 320. As seen in FIG. 3, processor 330 is in connection with memory 360 through which processor 130 can store and retrieve data, such as an inventory list, as discussed further below. A plurality of medical products having wireless tags 301-307 establish a mesh network 340, as described above, by forming a number of wireless links amongst the wireless tags 301-307. Antenna 320 is connected to mesh network 340 via one or more wireless links, such as wireless link 310. In various different aspects, processor 330 monitors mesh network 340 through antenna 320 in a number of ways, including, for example, regularly polling each of the wireless tags to which antenna 320 is connected in order to determine which other wireless tags it is connected to, etc. When one or more of wireless tags 301-307 is removed from the mesh network (e.g., because the corresponding medical product with the wireless tag has been dispensed), processor 330 detects their absence when a response is not received from the removed wireless tags in response to a query from antenna 320, as described further below. Processor 330 also detects the addition of new wireless tags (associated with medical products newly added to storage area 300) to mesh network 340 by conducting a scan for new tags.

In accordance with certain embodiments, antenna 320 is configured to periodically operate at a higher broadcast power, to temporarily form separate wireless links with each of the wireless tags on medical products 301-307, to verify that mesh network 340 is accurately reporting the presence of all wireless tags therein, and not inadvertently reporting the presence of a wireless tag that has already been dispensed.

In some aspects, the inventory monitoring system is operably coupled to a database 350, as shown in FIG. 3. As will be readily apparent to those of skill in the art, this configuration permits processor 330 of the system to share information regarding the dispensation of medical products, such as an inventory list, from storage area 300 with database 350, for storage of inventory tracking data. According to certain embodiments, each wireless tag is associated with a unique wireless tag identification number, permitting a single medical product that is associated with the tag to be tracked. Database 350 thereby allows the inventory monitoring system to share other information about medical products 301-307 with database 350 as well, as is discussed in greater detail below.

According to certain aspects, processor 330 is configured to generate low-stock or out-of-stock warnings when a stored amount of a particular type of medical product in storage area 300 is at or below a predetermined threshold. In some aspects, such a warning is provided to a remote user over a network connection such as, for example, a network connection utilized to operably couple the inventory monitoring system to database 350. Alternatively, database 350 is connected to another separate processor or other computing device which is configured to generate similar warnings based on stored amounts of various medical products reported to database 350.

Figure 4A:
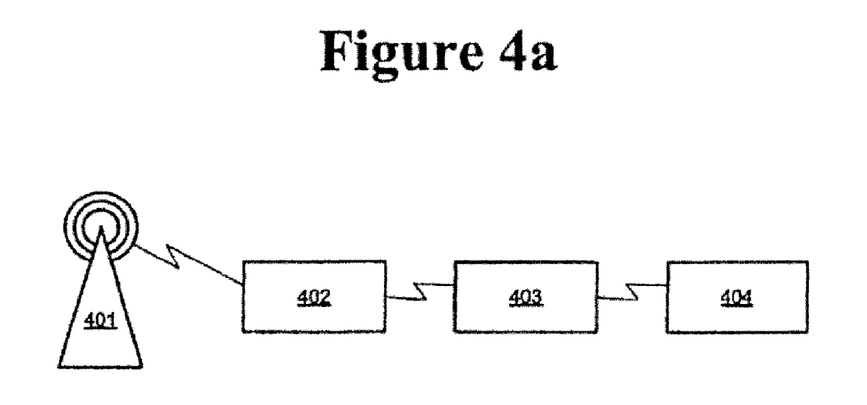
FIG. 4a is a block diagram illustrating a network of wireless tags in accordance with certain embodiments.
Figure 4B:
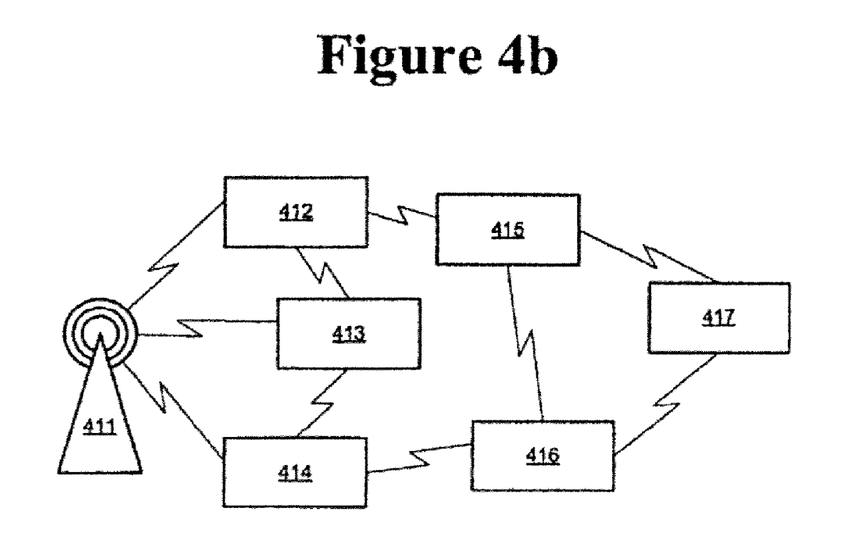
FIG. 4b is a block diagram illustrating a network of wireless tags in accordance with certain embodiments.

Mesh networks have various types of network topologies. For example, FIGS. 4a and 4b illustrate two possible network topologies. In FIG. 4a, a network of three wireless tags 402-404 is connected to an antenna 401. In this network configuration, antenna 401 is configured to form and maintain one wireless link (i.e., the wireless link between antenna 401 and wireless tag 402), and each wireless tag 402-404 is configured to form and maintain two wireless links (e.g., wireless tag 402 forms a link with antenna 401 and a link with wireless tag 403, wireless tag 403 forms a link with wireless tag 402 and wireless tag 404). Accordingly, this network topology is capable of being envisioned as a "chain" topology. As can be seen with reference to FIG. 4a, the last "link" in the chain, wireless tag 404, only forms one wireless link (i.e., with wireless tag 403), because no further wireless tags are in its vicinity. In this configuration, wireless tag 404 periodically polls its vicinity to determine if another wireless tag has come within range. Because wireless tags 402-404 are configured to collect and share information concerning the mesh network that they have formed, as soon as wireless tag 404 forms another wireless link (e.g., with a newly added wireless tag), that information will be relayed up the chain through wireless tags 403 and 402, in turn, to antenna 401 (and from antenna 401 to an associated processor, as already described in greater detail above).

Turning to FIG. 4b, another network of wireless tags is illustrated in accordance with certain embodiments. In the network topology of FIG. 4b, each of antenna 411 and wireless tags 412-417 are configured to form and maintain three wireless links. Accordingly, when a wireless tag is added to or removed from the mesh network, this information will have several possible routes to antenna 411 (and its associated processor), rendering the network more robust, albeit at the cost of greater power consumption (and concomitant shorter battery life) in each of the wireless tags of such a network.

According to one aspect, a mesh network, such as is illustrated in FIG. 4b, maintains information not only about the identity of wireless tags in the network, but about the relationship of those tags (e.g., information about which tags share links). This information about the topology of the network solves an additional problem common to wireless tag-based product dispensing, in which a user can "cheat" a dispensation system by removing a product from its packaging, and replacing the packaging, with the wireless tag, into the system. By so doing, the user can fool the system into believing that the inventory has not changed (as the tag is still registered as present). With a mesh network that maintains topology information, however, removing a product (even temporarily) will cause the links of that product's wireless tag to be removed from the mesh network, and replaced elsewhere in the topology (when the empty packaging is returned). In some aspects, if during a subsequent inspection an empty package is discovered, the system identifies the user associated with the change in topology of the empty packaging. In this way, a mesh style topology addresses the problem of "spoofing" a dispensation system by removing the product, but not the tag, from the system.

In accordance with certain embodiments, wireless tags 412-417 communicate with one another at frequency that requires less power (e.g., and which has a smaller range) than the frequency with which the network communicates with antenna 411 (e.g., via wireless tags 412-414). According to such an embodiment, each wireless tag only has an effective range of communication sufficient to encompass some of its neighbors. For example, wireless tag 417 does not broadcast and receive with sufficient power to form a wireless link directly with wireless tag 412, which is located at some distance from wireless tag 417. Rather, wireless tag 417 utilizes a lower-power frequency to communicate directly only with wireless tags 415 and 416. In other aspects, to ensure a robust connection between the network and antenna 411, wireless tags 412-414 utilize a higher-power frequency to maintain wireless links with antenna 411. In another arrangement, all of wireless tags 412-417 and antenna 411 utilize the same frequency, but wireless tags 412-417 utilize different power levels (e.g., via greater or lesser amplification) depending upon whether they are communicating with antenna 411 or another wireless tag.

While the foregoing exemplary embodiments have described two particular network topologies, embodiments are not limited to these particular configurations. As will be readily apparent to those of skill in the art, any one of a number of network topologies, or any combination thereof, are is capable of being utilized in a mesh network of wireless tags.

Figure 5:
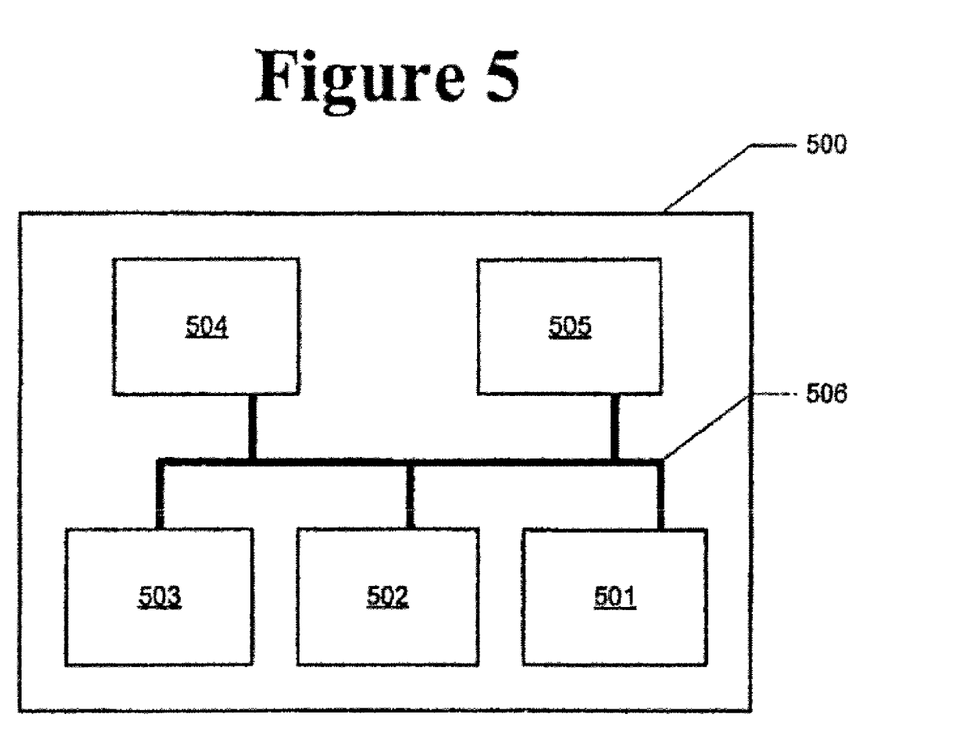
FIG. 5 is a block diagram illustrating a wireless tag in accordance with certain embodiments.

In another aspect, a wireless tag that is associated with a medical product provides additional functionality beyond assisting in the inventory monitoring and tracking of dispensation of the medical product from a storage device. For example, such a wireless tag is able to sense environmental factors that could impact the medical product to which it is attached (e.g., heat, radiation, humidity, moisture, chemical exposure, etc.), and report those environmental factors to an inventory monitoring system. For example, FIG. 5 illustrates a wireless tag 500 in accordance with certain embodiments. Wireless tag 500 includes an antenna 501 for communicating with the antenna of an inventory monitoring system and with the antennas of other wireless tags. A processor 502 is also provided, to control antenna 501 and to retrieve information from and store information in memory 503. The information stored in memory 503 is obtainable from antenna 501 (e.g., information about other wireless tags in range, information about the storage area in which wireless tag 500 is disposed, etc.), or from environmental sensor 504. In one embodiment, memory 503 also stores program code for execution by processor 502, which configures wireless tag 500 to form mesh networks, communicate with inventory monitoring systems, measure environmental information, etc. A bus 506 is used to connect antenna 501, processor 502, memory 503 and environmental sensor 504, and a battery 505 is included to provide power to wireless tag 500 for operation of the above-mentioned components. In certain embodiments, battery 505 is replaceable and/or rechargeable. Wireless tag 500 as shown in FIG. 5 is typically referred to as an active tag. However, wireless tag 500 may have less than all components shown in FIG. 5 thereby providing a lower cost, lower functionality and lower size, and such wireless tags are typically referred to as passive, or semi-passive tags.

According to particular embodiments, environmental sensor 504 is configured to sense many different environmental parameters of interest. For example, environmental sensor 504 is configured to measure ambient temperature, to inform when a medical product to which wireless tag 500 is associated is in danger of being compromised by an extreme temperature level. Environmental sensor 504 is alternately configured to measure the ambient humidity, to similarly inform when the medical product associated with wireless tag 500 is in danger of being compromised by an extreme humidity level. With this information, administrative personnel are able to correct environmental hazards (such as excess moisture and heat) in a storage area in time to prevent medical products from becoming compromised or destroyed.

While wireless tag 500 has been illustrated as including a single environmental sensor, embodiments are not limited to this particular arrangement. Rather, any number of environmental sensors are included on a wireless tag. In other aspects, some wireless tags are not provided with any wireless sensors at all, others have multiple environmental sensors, and still others have multiple redundant sensors (e.g., more than one sensor configured to measure temperature) to ensure the accuracy thereof.

Associating a wireless tag such as wireless tag 500 with a medical product presents a challenge: if the wireless tag is not securely attached to the medical product, it has the capability of being removed, either accidentally or intentionally, prematurely (e.g., before medical product is consumed or otherwise used), and thereby foil the inventory monitoring system. Some methods of securely attaching a wireless tag to a medical product, however, require compromising the sterile packaging thereof, which is an equally unacceptable solution. Accordingly, in certain aspects, an environmental sensor of a wireless tag is configured to measure the attachment status of a wireless tag to a medical product (e.g., by maintaining electrical contact with a metal conductor of a medical product, or by depressing a pressure switch, etc.). Should the wireless tag sense that it is no longer attached to the medical product, it provides this information to an inventory monitoring system. Thus, should a user seek to remove a medical product from an inventory monitoring system without alerting the system, the wireless tag will report its removal from the medical product, and associate the last user that accessed the storage area with the removal. In this way, the wireless tag is secured to a medical product without compromising the sterile packing thereof, while mitigating the risk of removal therefrom. In this manner, attachment status is considered as another type of environmental information collected by and stored in wireless tag 500.

The environmental information collected by wireless tag 500 can be communicated to a database operably coupled to an inventory monitoring system, via either a direct link between wireless tag 500 and the antenna of the system, or via a mesh network of wireless tags which relays the information to the system. In other aspects, other information that wireless tag 500 can track and relay to the database includes the location of the last storage area in which the wireless tag was disposed, the duration of the last storage period, etc. This level of environmental information tracking provides a comprehensive database of inventory health, location, and access, which, as will be readily apparent to those of skill in the art, can be of great advantage to a hospital administrator or other care provider.

According to certain embodiments, a wireless tag such as wireless tag 500 is reusable once the product to which it is attached has been consumed and/or removed. In such an embodiment, once wireless tag 500 is removed from the product, it is capable of receiving a signal to execute code stored in memory 503 to re-initialize the tag (e.g., to clear memory 503 of stored environmental information, to optionally generate a new unique identification number, etc.) and then to associate with wireless tag with a new medical product. Of course, in certain embodiments, this function is limited to an administrator with appropriate authority by using a secure mechanism such as a password, key or biometric identifier in order to transmit a signal to execute such code. The ability to reuse wireless tags adds significant value to the inventory monitoring systems, as no part of the system need be consumable or exhaustible.

As mentioned above, certain aspects relate to the inventory monitoring of medical products contained within a storage area. In this manner, the system is capable of determining whether from time to time whether any products have been removed from the storage area, such as a securable cabinet, and whether any products have been added to the storage area. These activities are common in a medical care environment when a medical caregiver removes products from a secure cabinet for use and when a medical administrator adds products to the cabinet to re-supply a low stock. An inventory monitoring process is conducted on a periodic basis or is event-triggered, such as when a door to the storage area has been opened and then closed, indicating that a transaction involving the addition or removal of a medical product from the storage area has occurred.

Some inventory systems conduct an inventory monitoring process by periodically scanning a storage area to identify all products currently stored in the storage area and creating a current inventory list. Then, such systems compare the current inventory list with a past inventory list to determine if any products have been removed. The problem with such systems is that this periodic "scanning" to discover all currently present products takes significant time and processing resources until the scan is completed and the new current inventory list can be completed. This is because the "scan" is a general broadcast query which is not addressed to any particular wireless tag (such as an RFID tag). In response to such a general scan broadcast query, the wireless tags currently located in the storage area send back a generic response signal. Then, for each responding wireless tag, the system sends at least one secondary query directed specifically to the responding wireless tag to obtain its identification and to obtain information related to the corresponding tag and associated medical product. The wireless tag then responds with such information which is then processed and stored by the inventory monitoring system. As it can be appreciated, this is a cumbersome process as it results in multiple communications between each wireless tag and the inventory monitoring system, including lengthy data transmissions from each wireless tag to the inventory monitoring system. In summary, the performance of such a periodic scan-and-discover process by an inventory monitoring system is basically like blindly starting new every time to discover tags currently present in the storage area without the use of any knowledge of a past inventory.

Figure 6:
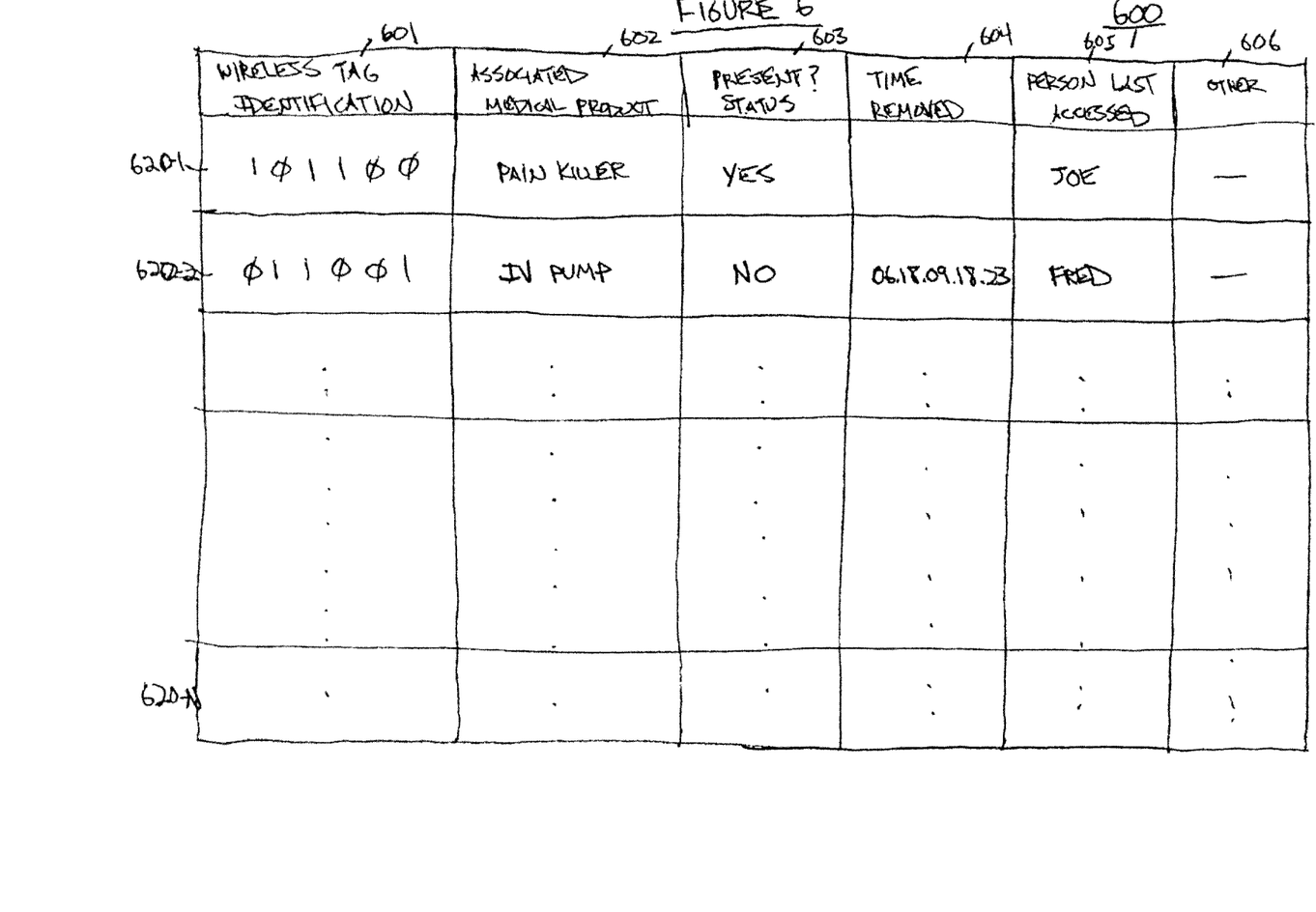
FIG. 6 is a block diagram that illustrates an inventory list structure in accordance with certain embodiments.

An inventory monitoring system is provided that conducts an inventory monitoring process which is much faster because it requires less communications and data transmission between the currently present wireless tags and the system to conduct an inventory update, in comparison to a periodic "scan-and-discover" inventory process as discussed above. FIG. 6 is a block diagram that illustrates an inventory list according to one aspect. Inventory list 600 is capable of being stored in a memory of the inventory monitoring system, such as memory 140 shown in FIGS. 1a, 1b, 2a and 2b, or such as memory 360 or database 350 shown in FIG. 3. In certain embodiments, multiple versions of such an inventory list are maintained in a memory of the inventory monitoring system, such as a past inventory list and a current inventory list. In this manner the lists can be compared to determine the transactions involving removal and/or addition of medical products during the time between the generation of the past inventory list and of the current inventory list.

Returning to FIG. 6, it is seen that inventory list 600 is comprised of multiple records 620-1 through 620-N. Each of records 620-1 through 620-N is related to a particular wireless tag which is either currently present in the storage area or which was previously present in the storage area but is no longer present. Each of records 620-1 through 620-N includes multiple data fields, including but not limited to, wireless tag identification 601, associated medical product 602, present status 603, time removed 604, person last accessed 605, and other 606 which is capable of including further data fields for information related to the medical product, environmental factor of the storage area, and other pertinent information.

In some aspects, when the inventory monitoring system conducts an inventory monitoring process it retrieves a past inventory list from a past inventory monitoring process and then updates that list to generate a current inventory list. As seen in the example of record 620-1 shown in FIG. 6, a wireless tag identification 601 of 101100 is associated with record 620-1 and corresponds to a wireless tag associated with medical product 602 that is a pain killer medication. Record 620-1 indicates that the medical product has a present status of YES meaning that it is currently present in the storage area. Accordingly, this record has no entry in the Time Removed data field 604. The Person Last Accessed data field 605 indicates that Joe was the last person who accessed the storage area when this record changed status. Since the medical product is currently present, this means that Joe was the identified user who added the medical product to the storage area. In contrast, record 620-2 has a wireless tag identification 601 of 011001 and corresponds to a wireless tag associated with medical product 602 that is an IV pump which is no longer present in the storage area, and was removed on the date of Jun. 18, 2009 at 6:23 pm by Fred. In this manner, the inventory list provides a succinct inventory tracking of the medical products which are currently, and were previously, stored in the storage area. Of course, inventory list 600 is exemplary and other forms and modes of tracking data related to wireless tags are capable of performing these functions, such as tables, link lists, databases, and other data formats.

Figure 7:
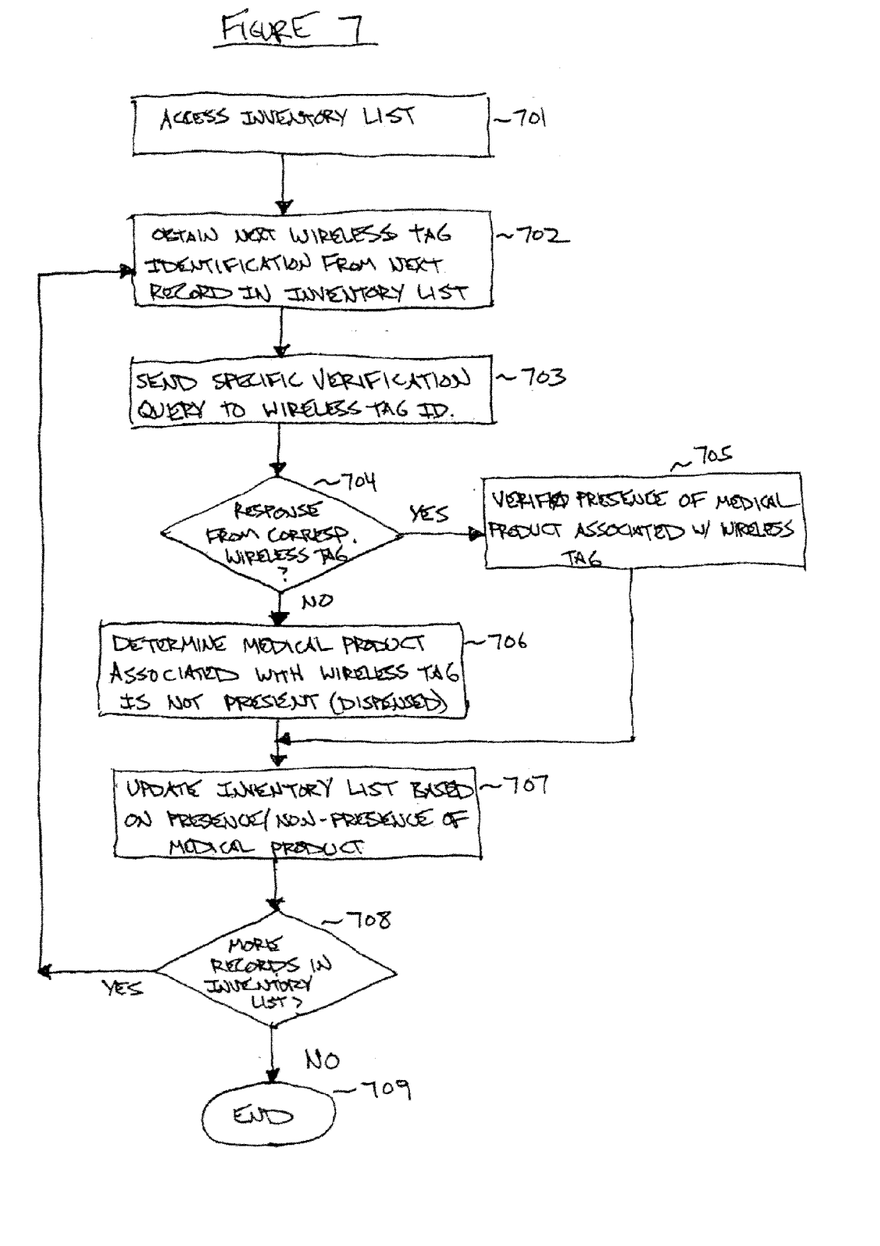
FIG. 7 is a flow chart illustrating an inventory monitoring process for verifying an inventory of products in a storage device in accordance with certain embodiments.

FIG. 7 is a flow chart illustrating an inventory monitoring process for verifying an existing inventory of products in a storage device in accordance with certain embodiments. Turning to FIG. 7, an inventory list already stored in the system is accessed, such as from memory 140 of FIG. 1a, or database 350 of FIG. 3. In certain embodiments, the inventory list is a past inventory list that was generated and/or updated during the last time that an inventory monitoring process was conducted. As described above, the inventory list contains at least one, but typically a plurality, of records associated with various wireless tags (and their corresponding medical products) present in the storage area at the time that the last inventory monitoring process was conducted. In some aspects, the inventory list also contains records associated with wireless tags (and their corresponding medical products) that were previously present in the storage area prior to the time that the last inventory monitoring process was conducted, and are indicated as no longer being present. In step 702, the next record of the inventory list is accessed and the wireless tag identification is obtained if the wireless tag is identified in the inventory list as being present.

In step 703, the verification process begins by sending a specific verification query to the wireless tag having the wireless tag identification, via the antenna of the inventory monitoring system. In certain embodiments, the specific verification query to the wireless tag contains the wireless tag identification, and in other embodiments, the specific verification query to the wireless tag contains a shortened "derived" unique identifier which is derived from the longer, full wireless tag identification. Such a derived unique identifier may be a checksum of the full wireless tag identification, wherein the checksum is a shorter data string and that enables a faster verification step. Of course, it should be appreciated that a derived unique identifier can be generated by other methods, such as various compression algorithms and the like. In a certain aspect, the specific verification query also contains a function code that instructs the particular wireless tag to respond if the tag's identification matches the wireless tag identification (or secondary unique identifier) in the specific verification query. In another aspect, the specific verification query also contains a function code that instructs the particular wireless tag to enter a quiescent state after it responds to the specific verification query. This prevents the particular wireless tag from responding at a later time if a general scan is performed to identify the presence of new wireless tags in the system, as discussed further below. It is determined in step 704 whether the antenna of the inventory monitoring system received a response from the specific wireless tag in response to the specific verification query. In certain aspects, the specific verification query will elicit a response only from the wireless tag corresponding to the wireless tag identification (or secondary unique identifier) contained in the specific verification query, and all other wireless tags in the storage area will not respond to the specific verification query. If, in step 704, it is determined that the antenna of the inventory monitoring system has received a response from the specific wireless tag in response to the specific verification query, then the presence of the medical product associated with the specific wireless tag is indicated as verified in step 705. If, however, it is determined in step 704 that the antenna of the inventory monitoring system has not received a response from the specific wireless tag in response to the specific verification query, then it is determined that the medical product associated with the specific wireless tag is not present (has been dispensed) in step 706.

The record of the inventory list is then updated in step 707 to reflect the current "present" status of the corresponding medical product in the storage area as being either verified as present or determined to not be present. As mentioned above, in some aspects the time of removal is recorded in the inventory list if the medical product is no longer present, along with the user that accessed the storage area at the time of the removal. Next, in step 708, it is determined whether there are more records in the inventory list that have not yet been processed. If so, the process flow returns to step 702 and steps 702 to 708 are repeated. If there are no more records in the inventory list that have not yet been processed, then the process ends at step 709. In this manner, the inventory monitoring system performs a verification process of an already-known inventory list of wireless tag identifications by using a specific verification query tailored to each wireless tag identification in the already-known inventory list. This verification process thereby avoids the time-consuming communications and data transmissions associated with a typical "scan-and-discover" process for determining the presence of those wireless tags that were already identified in the last inventory list.

Figure 8:
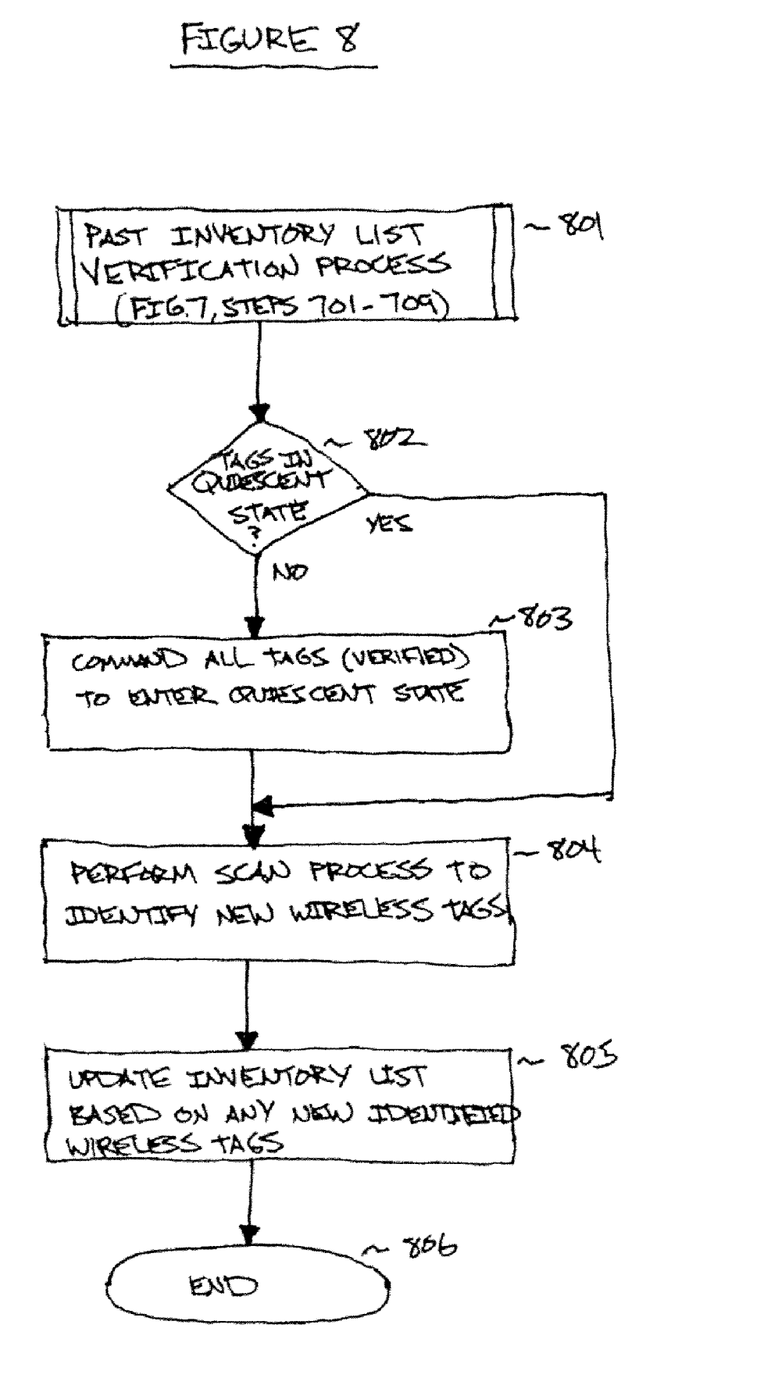
FIG. 8 is a flow chart illustrating an inventory monitoring process for identifying an inventory that includes new products in a storage device in accordance with certain embodiments.

In addition to the above verification process described with respect to FIG. 7, certain embodiments also determine whether new medical products were added to the storage area by performing a second step of scanning for new products after the verification of already-known wireless tags has been completed. FIG. 8 is a flow chart illustrating an inventory monitoring process for verifying the presence of already-known wireless tags and identifying an inventory of new products in a storage area in accordance with certain embodiments. In FIG. 8, step 801 is representative of the verification process described above with respect to steps 701-709 of FIG. 7. Once this verification process of FIG. 7 is conducted, it is determined in step 802 whether the verified wireless tags have already been placed in a quiescent state. As discussed above with respect to step 703 of FIG. 7, the specific verification query sent in step 703 may also contain a function code that instructs the particular wireless tag to enter a quiescent state after it responds to the specific verification query. This prevents the particular wireless tag from responding at a later time if a general scan is performed to identify the presence of new wireless tags in the system. If it is determined in step 802 that all verified wireless tags were already instructed in step 703 to enter a quiescent state after responding to their specific verification queries, then the process flow passes to step 804. However, if it is determined in step 802 that all verified wireless tags were not instructed in step 703 to enter a quiescent state after responding to their specific verification queries, then a "quiet" command is sent in step 803 to all wireless tags in the inventory list that were already verified as being present in the process of step 801. This "quiet" command instructs all such verified wireless tags to go into a quiescent state, either for a fixed period of time, or until otherwise instructed through a communication directed specifically to the particular wireless tags.

In step 804, a typical scan-and-discover process is then conducted to identify newly-added wireless tags in the storage area. The already verified wireless tags from the inventory list will not respond to this scan process because they have been placed into a quiescent state. Accordingly, the scan process will only involve wireless tags associated with medical products that were newly added to the storage area since the last inventory monitoring process was conducted. In this manner, the amount of communications and data transmissions associated with such a scan process are significantly reduced because the scan process does not involve any of the already verified wireless tags in the storage area. The inventory list is then updated in step 805 to add a record for each of the newly added wireless tags (associated with newly added medical products) in the storage area. The process then ends at step 806.

Figure 9:
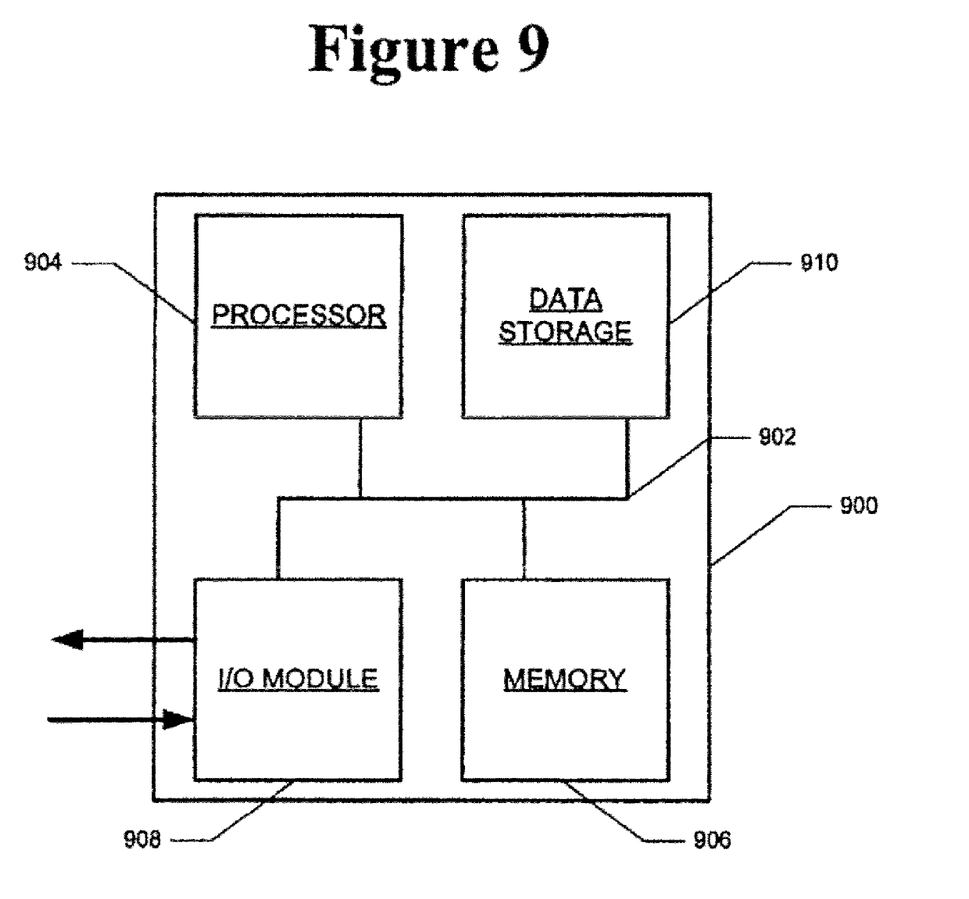
FIG. 9 is a block diagram that illustrates a computer system upon which certain embodiments are implemented.

FIG. 9 is a block diagram that illustrates an exemplary computing system 900 upon which certain embodiments are implemented in cooperation with at least one storage area. Computer system 900 includes a bus 902 or other communication mechanism for communicating information, and a processor 904 coupled with bus 902 for processing information. Computer system 900 also includes a memory 906, such as a random access memory ("RAM") or other dynamic storage device, coupled to bus 902 for storing information and instructions to be executed by processor 904. Memory 906 is also capable of being used to store temporary variable or other intermediate information during execution of instructions to be executed by processor 904. Computer system 900 further includes a data storage device 910, such as a magnetic disk, optical disk or solid state memory device, coupled to bus 902 for storing information and instructions.

In some aspects, computer system 900 is coupled via I/O module 908 to a display device (not illustrated), such as a cathode ray tube ("CRT") or liquid crystal display ("LCD") for displaying information to a computer user. An input device, such as, for example, a keyboard or a mouse, is also be coupled to computer system 900 via I/O module 908 for communicating information and command selections to processor 904.

According to one embodiment, monitoring the inventory of medical products in a storage device is performed by a computer system 900 in response to processor 904 executing one or more sequences of one or more instructions contained in memory 906. In certain aspects, such instructions are read into memory 906 from another machine-readable medium, such as data storage device 910. Execution of the sequences of instructions contained in main memory 906 causes processor 904 to perform the process steps described herein. One or more processors in a multi-processing arrangement are employed to execute the sequences of instructions contained in memory 906, or received from another source via bus 902. In alternative embodiments, hard-wired circuitry is used in place of or in combination with software instructions to implement the described functions. Thus, embodiments are not limited to any specific combination of hardware circuitry and software.

The term "machine-readable medium" as used herein refers to any medium that participates in providing instructions to processor 904 for execution. Various forms of such a medium are acceptable for such use, including, but not limited to, non-volatile media, volatile media, and transmission media, such as a wired or wireless link. Non-volatile media include, for example, optical or magnetic disks, such as data storage device 910. Volatile media include dynamic memory, such as memory 906. Transmission media include coaxial cables, copper wire, and fiber optics, including the wires that comprise bus 902. In other aspects, transmission media takes the form of electromagnetic waves, acoustic waves, or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory device, chip or cartridge, a carrier wave, or any other medium from which a computer can read.

The description herein is provided to enable any person skilled in the art to practice the various embodiments described herein. While the embodiments and aspects herein have been particularly described with reference to the various figures and embodiments, it should be understood that these are for illustration purposes only and should not be taken as limiting the scope of such embodiments and aspects. For example, while the inventory monitoring system has been described with reference to medical applications, wireless tags are applicable to any type of product, whether or not medical in nature, to provide automated and accurate inventory monitoring and dispensation tracking.

There are other ways to implement the above-described embodiments and aspects. Various functions and elements described herein are capable of being partitioned differently from those shown without departing from the spirit and scope thereof. Various modifications to these embodiments will be readily apparent to those skilled in the art, and generic principles defined herein are applicable to other embodiments. Thus, many changes and modifications to the described embodiments and aspects are capable of being made by one having ordinary skill in the art without departing from the spirit and scope thereof.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the described embodiments and aspects, and are not referred to in connection with the interpretation of the described embodiments and aspects. All structural and functional equivalents to the elements of the various embodiments described throughout this disclosure that are known or later come to be known to those of ordinary skill in the art are expressly incorporated herein by reference and intended to be encompassed by the described embodiments and aspects. Moreover, nothing disclosed herein is intended to be dedicated to the public regardless of whether such disclosure is explicitly recited in the above description.

What is claimed is:

1. A method for monitoring an inventory of products in a storage device that has an antenna, each product having a corresponding wireless tag with a corresponding wireless tag identification, the method comprising the steps of:

accessing an inventory list containing at least one wireless tag identification;

sending, for each of the at least one wireless tag identification in the inventory list, a specific query via the antenna to the wireless tag corresponding to the wireless tag identification;

verifying that the product corresponding to the wireless tag is present in the storage device when a response is received via the antenna from the wireless tag corresponding to the wireless tag identification;

determining that the product corresponding to the wireless tag is not present in the storage device when a response is not received via the antenna from the wireless tag corresponding to the wireless tag identification; and updating the inventory list based on the products verified to be present and the products determined to not be present.

2. The method of claim 1, wherein each specific query is sent via the antenna to the corresponding wireless tag via a wireless link between the antenna and the wireless tag.

3. The method of claim 1, wherein each wireless tag is an active RFID tag.

4. The method of claim 1, wherein in the accessing step, the inventory list is accessed from a memory device.

5. The method of claim 4, wherein the inventory list that is accessed from a memory device is a prior inventory list that was generated during a prior inventory monitoring operation.

6. The method of claim 1, wherein the specific query sent to the wireless tag contains the wireless tag identification that corresponds to the wireless tag.

7. The method of claim 1, wherein the inventory list further contains a present status indicator corresponding to each of the at least one wireless tag identification, the present status indicator providing an indication of whether the wireless tag that corresponds to the wireless tag identification is present in the storage device.

8. The method of claim 1, wherein the specific query sent to the wireless tag contains a unique identification code that corresponds to the wireless tag.

9. The method of claim 8, wherein the unique identification code is a checksum value of the wireless tag identification that corresponds to the wireless tag.

10. The method of claim 1, further comprising the steps of:
commanding all wireless tags verified in the verifying step to be present in the storage device to enter a quiescent state;
performing a scan operation to determine the presence of a new wireless tag that does not have a corresponding wireless tag identification in the inventory list; and
updating the inventory list to include each new wireless tag determined to be present during the scan operation.

11. The method of claim 10, further comprising the step of:
commanding all wireless tags verified in the verifying step to exit the quiescent state upon completion of the scan operation.

12. An inventory monitoring system for monitoring an inventory of products each of which has a corresponding wireless tag with a corresponding wireless tag identification, comprising:
a securable storage area;
an antenna operable to receive and transmit signals within the securable storage area; and
a processor configured to:

access an inventory list containing at least one wireless tag identification;

send, for each of the at least one wireless tag identification in the inventory list, a specific query via the antenna to the wireless tag corresponding to the wireless tag identification;

verify that the product corresponding to the wireless tag is present in the securable storage area when a response is received via the antenna from the wireless tag corresponding to the wireless tag identification;

determine that the product corresponding to the wireless tag is not present in the securable storage area when a response is not received via the antenna from the wireless tag corresponding to the wireless tag identification; and update the inventory list based on the products verified to be present and the products determined to not be present in the securable storage area.

13. The inventory monitoring system of claim 12, wherein each specific query is sent via the antenna to the corresponding wireless tag via a wireless link between the antenna and the wireless tag.

14. The inventory monitoring system of claim 12, wherein each wireless tag is an active RFID tag.

15. The inventory monitoring system of claim 12, further comprising a memory device that is operationally coupled to the processor, wherein in the accessing step the inventory list is accessed from the memory device.

16. The inventory monitoring system of claim 15, wherein the inventory list that is accessed from the memory device is a prior inventory list that was generated during a prior inventory monitoring operation.

17. The inventory monitoring system of claim 12, wherein the specific query sent to the wireless tag contains the wireless tag identification that corresponds to the wireless tag.

18. The inventory monitoring system of claim 12, wherein the inventory list further contains a present status indicator corresponding to each of the at least one wireless tag identification, the present status indicator providing an indication of whether the wireless tag that corresponds to the wireless tag identification is present in the securable storage area.

19. The inventory monitoring system of claim 12, wherein the specific query sent to the wireless tag contains a unique identification code that corresponds to the wireless tag.

20. The inventory monitoring system of claim 19, wherein the unique identification code is a checksum value of the wireless tag identification that corresponds to the wireless tag.

21. The inventory monitoring system of claim 12, wherein the processor is further configured to:
command all wireless tags verified in the verifying step to be present in the storage device to enter a quiescent state;
perform a scan operation to determine the presence of a new wireless tag that does not have a corresponding wireless tag identification in the inventory list; and
update the inventory list to include each new wireless tag determined to be present during the scan operation.

22. The inventory monitoring system of claim 21, wherein the processor is further configured to command all wireless tags verified in the verifying step to exit the quiescent state upon completion of the scan operation.

* * * * *